(12) United States Patent
Berroteran et al.

(10) Patent No.: US 11,967,824 B2
(45) Date of Patent: Apr. 23, 2024

(54) ADAPTIVE GAIN CONTROL FOR A REACTIVE POWER REGULATOR OF AN INVERTER-BASED RESOURCE

(71) Applicant: General Electric Renovables Espana, S.L., Barcelona (ES)

(72) Inventors: Igor Berroteran, Salem, VA (US); Enno Ubben, Steinfurt (DE); Dustin Howard, Brookhaven, GA (US)

(73) Assignee: General Electric Renovables Espana, S.L., Barcelona (ES)

( * ) Notice: Subject to any disclaimer, the term of this patent is extended or adjusted under 35 U.S.C. 154(b) by 261 days.

(21) Appl. No.: 17/511,939

(22) Filed: Oct. 27, 2021

(65) Prior Publication Data
US 2023/0126579 A1  Apr. 27, 2023

(51) Int. Cl.
  H02J 3/24 (2006.01)
  G05B 15/02 (2006.01)
  H02J 3/38 (2006.01)
  H02P 9/00 (2006.01)

(52) U.S. Cl.
  CPC ............ *H02J 3/24* (2013.01); *G05B 15/02* (2013.01); *H02J 3/381* (2013.01); *H02P 9/007* (2013.01); *H02J 2300/28* (2020.01)

(58) Field of Classification Search
  None
  See application file for complete search history.

(56) References Cited

U.S. PATENT DOCUMENTS

| 10,804,707 B2 | 10/2020 | Djan-Sampson et al. |
| 11,063,441 B2 | 7/2021 | Djan-Sampson et al. |
| 2007/0121354 A1* | 5/2007 | Jones ............... H02J 3/381 363/67 |

(Continued)

FOREIGN PATENT DOCUMENTS

WO   WO 2020/254161 A1   12/2020

OTHER PUBLICATIONS

The EP Search Report for EP application No. 22198476.8, dated Mar. 28, 2023, 11 pages.

(Continued)

*Primary Examiner* — Mohammad Ali
*Assistant Examiner* — Saad M Kabir
(74) *Attorney, Agent, or Firm* — Dority & Manning, P.A.

(57) ABSTRACT

A method for controlling an inverter-based resource having a power converter connected to an electrical grid includes receiving, via a regulator of a controller of the inverter-based resource, a plurality of power signals. The method also includes determining, via the regulator, a power error signal as a function of the plurality of power signals. Further, the method includes receiving, via the regulator, a dynamic multiplier factor from a supervisory controller. Moreover, the method includes applying, via the regulator, the dynamic multiplier factor to one or more gains of the regulator to determine one or more modified gains. In addition, the method includes applying the one or more modified gains to the power error signal to obtain an intermediate power signal. Thus, the method includes generating, via the regulator, one or more control commands for the power converter as a function of the intermediate power signal.

16 Claims, 9 Drawing Sheets

(56) References Cited

U.S. PATENT DOCUMENTS

2014/0239723 A1   8/2014  Beg
2015/0249412 A1   9/2015  Larsen et al.

OTHER PUBLICATIONS

Andersson, Lief Erik et al., Wind Farm Control—Part I: A Review on Control System Concepts and Structures, IET Renewable Power Generation, The Institution of Engineering and Technology, Michael Farrady House, Six Hills Way, Stevenage, Herts. SG1 2AY, UK, vol. 15, No. 10, Apr. 20, 2021, pp. 2085-2108.

Brahma, Sarnaduti et al., Optimal and Resilient Coordination of Virtual Batteries in Distribution Feeders, ARXIV. Org. Cornell University Library, 201 Olin Library Cornell University, Ithaca, NY, 14853, Oct. 7, 2020, abstract, pp. 1 and 7, and figure 5.

* cited by examiner

ADAPTIVE GAIN CONTROL FOR A REACTIVE POWER REGULATOR OF AN INVERTER-BASED RESOURCE

FIELD

The present disclosure relates generally inverter-based resources and, more particularly, to adaptive gain control for reactive power regulation of inverter-based resources.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity that is transferred to a power grid. The power grid transmits electrical energy from generating facilities to end users.

Wind power generation is typically provided by a wind farm, which contains a plurality of wind turbine generators (e.g., often 100 or more wind turbines). Typical wind farms have a farm-level controller that regulates the voltage, reactive power, and/or power factor at the wind farm interconnection point (i.e., the point at which the local wind turbine generators are connected to the grid; may also be referred to as the point of common coupling). In such wind farms, the farm-level controller achieves its control objectives by sending reactive power or reactive current commands to the individual wind turbine generators within the wind farm. However, certain constraints of the local wind turbine generators within the wind farm can constrain the capability to supply reactive power. Such constraints, may include, for example, voltage limits, reactive power limits, and/or current limits.

More specifically, when one or more of the wind turbine generators reaches one of the above constraints, the local turbine-level controllers may not be able to follow the requested reactive power command from the farm-level controller.

Moreover, many asynchronous power generating assets utilize grid-connected power converters to achieve certain dynamic control functions, including regulating speed, power, and mechanical loading of turbine components. For example, typical wind converter control strategies include meeting a reactive power reference received from a supervisory controller. Reactive power flow and voltage stability is affected by the strength of the coupling between the power converter of the wind turbine and the power system, such that is desirable to slow regulator response when coupling is weak, and increase regulator response when coupling is strong. However, such a balance can be difficult to achieve.

Accordingly, the present disclosure is directed to a reactive power regulation scheme with adaptive gain control for energy generation, e.g., in doubly-fed induction generator (DFIG) wind turbines, which allows regulator response to better match grid characteristics while maintaining stable operation.

BRIEF DESCRIPTION

Aspects and advantages of the invention will be set forth in part in the following description, or may be obvious from the description, or may be learned through practice of the invention.

In one aspect, the present disclosure is directed to a method for controlling an inverter-based resource connected to an electrical grid. The inverter-based resource has a power converter. The method includes receiving, via a regulator of a controller of the inverter-based resource, a plurality of power signals. The method also includes determining, via the regulator of the controller, a power error signal as a function of the plurality of power signals. Further, the method includes receiving, via the regulator of the controller, a dynamic multiplier factor from a supervisory controller. Moreover, the method includes applying, via the regulator of the controller, the dynamic multiplier factor to one or more gains of the regulator to determine one or more modified gains. In addition, the method includes applying the one or more modified gains to the power error signal to obtain an intermediate power signal. Thus, the method includes generating, via the regulator of the controller, one or more control commands for the power converter as a function of the intermediate power signal.

In an embodiment, the plurality of power signals may include a power command signal and a power feedback signal. In such embodiments, the power command signal may be a reactive power command signal or an active power command signal, whereas the power feedback signal may be a reactive power feedback signal or an active power feedback signal.

In another embodiment, the inverter-based resource is part of a power plant having a plurality of inverter-based resources. Thus, in such embodiments, the power plant may be controlled by the supervisory controller. In particular embodiments, the inverter-based resource may be a wind turbine and the power plant may be a wind farm.

In further embodiments, the method may further include dynamically determining, via the supervisory controller, the dynamic multiplier factor as a function of a number of the plurality of inverter-based resources that are online. For example, in an embodiment, dynamically determining, via the supervisory controller, the dynamic multiplier factor as a function of the number of the plurality of inverter-based resources that are online may include determining the number of the plurality of inverter-based resources that are online and dividing the number of the plurality of inverter-based resources that are online by a total number of the plurality of inverter-based resources in the power plant.

In additional embodiments, the method may include applying a limit to the one or more modified gains to limit how much the one or more gains can be reduced after applying the dynamic multiplier factor.

In another embodiment, the method may include determining, via the regulator of the controller, a feedforward signal as a function of one of the plurality of power signals and generating, via the regulator of the controller, the one or more control commands for the power converter as a function of the intermediate power signal and the feedforward signal.

In an embodiment, generating, via the regulator of the controller, the one or more control commands for the power converter as a function of the intermediate power signal and the feedforward signal may include summing the intermediate power signal and the feedforward signal together to obtain a sum, integrating the sum to determine a voltage command, determining a voltage error signal as a function of the voltage command and one or more voltage feedback signals, and regulating, via a voltage regulator of the controller, the voltage error signal to generate the one or more control commands, the one or more control commands comprising, at least, a reactive current command for the power converter.

In another aspect, the present disclosure is directed to a method for controlling an inverter-based resource connected to an electrical grid. The inverter-based resource has a power converter. The method includes applying a dynamic multiplier factor to one or more gains of a power regulator of a controller of the inverter-based resource to modify a bandwidth of the power regulator, thereby modifying a response time of the power regulator. The method also includes generating, via the power regulator of the controller, one or more control commands for a voltage regulator of the power converter using a plurality of power signals issued by a supervisory controller and the one or more gains. It should be understood that the method may further include any additional steps, features and/or embodiments described herein.

In yet another aspect, the present disclosure is directed to a system for controlling an inverter-based resource connected to an electrical grid. The inverter-based resource has a power converter. The system includes a supervisory controller and a local controller communicatively coupled to the supervisory controller. The local controller includes a power regulator and a voltage regulator. The power regulator is configured to perform a plurality of operations, including but not limited to receiving a plurality of power signals, determining a power error signal as a function of the plurality of power signals, receiving a dynamic multiplier factor from the supervisory controller, applying the dynamic multiplier factor to one or more gains of the regulator to determine one or more modified gains, applying the one or more modified gains to the power error signal to obtain an intermediate power signal, and generating one or more control commands for the power converter as a function of the intermediate power signal. It should be understood that the system may further include any additional features and/or embodiments described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a reactive power regulation scheme with adaptive gain control for energy generation, particularly useful in a doubly-fed induction generator (DFIG) wind turbine systems, which allows regulator response to better match grid characteristics while also maintaining stable operation. Typical wind converter control strategies include meeting a reactive power reference received from a turbine control entity. Reactive power flow and voltage stability is affected by the strength of the coupling between the wind turbine's power converter and power system, such that is desirable to slow regulator response when coupling is weak, and speedup regulator response when coupling is strong. Thus, the present disclosure provides a control scheme that accomplishes this goal using adaptive gain control. More particularly, the present disclosure is directed to systems and methods for calculating a gain multiplier as function of the number of online over total-available units within a plant, and then using the gain multiplier in the power regulator of each wind turbine generator. As such, using the gain multiplier supplied by the supervisory control in each of the individual power regulators allows the collective closed-loop response of the plant power regulation to be independent of the number of units online.

Although the present technology described herein is explained with reference to a wind farm having a plurality of wind turbine generators, it should be understood that the present technology may also be implemented for any suitable application having the ability to rapidly control reactive power. As used herein, inverter-based resources generally refer to electrical devices that can generate or absorb electric power through switching of power-electronic devices. Accordingly, inverter-based resource may include wind turbine generators, solar inverters, energy-storage systems, STATCOMs, or hydro-power systems.

Figure 1:
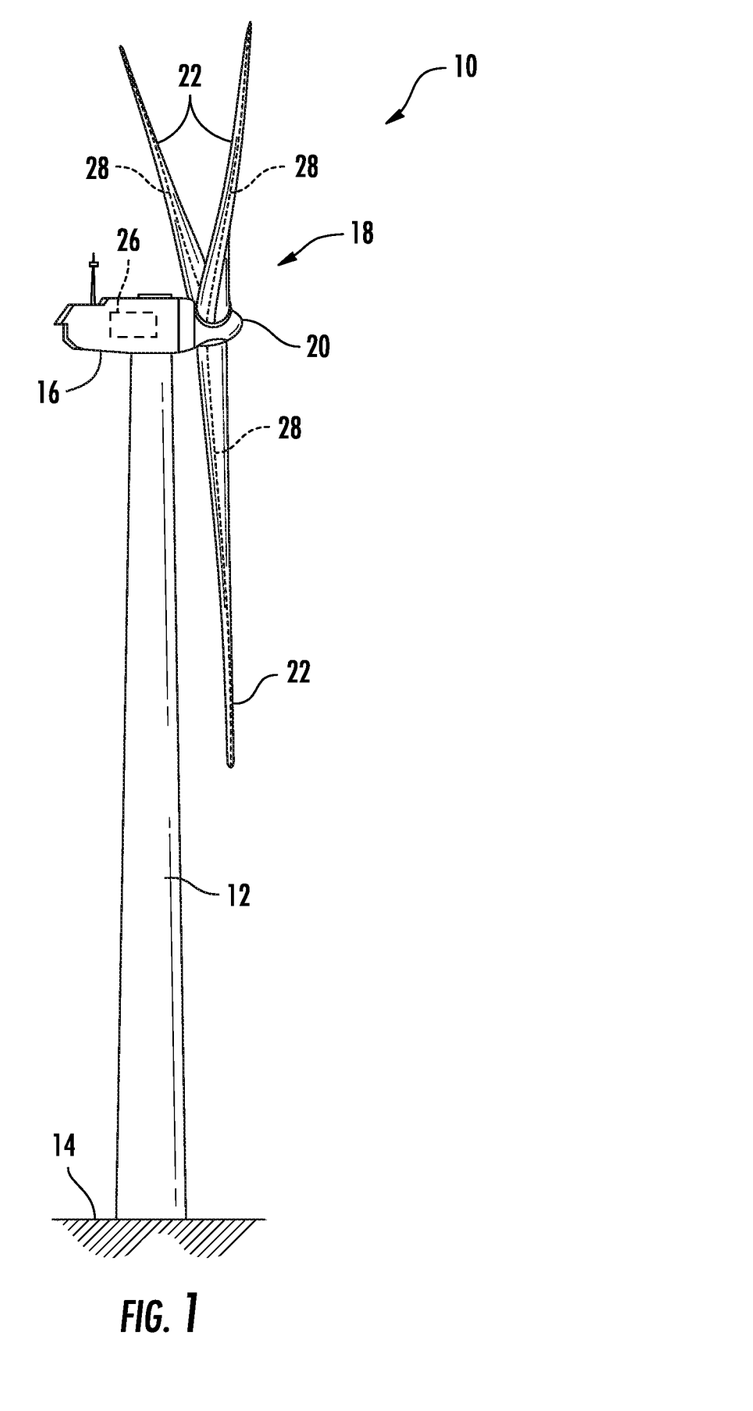
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 1) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
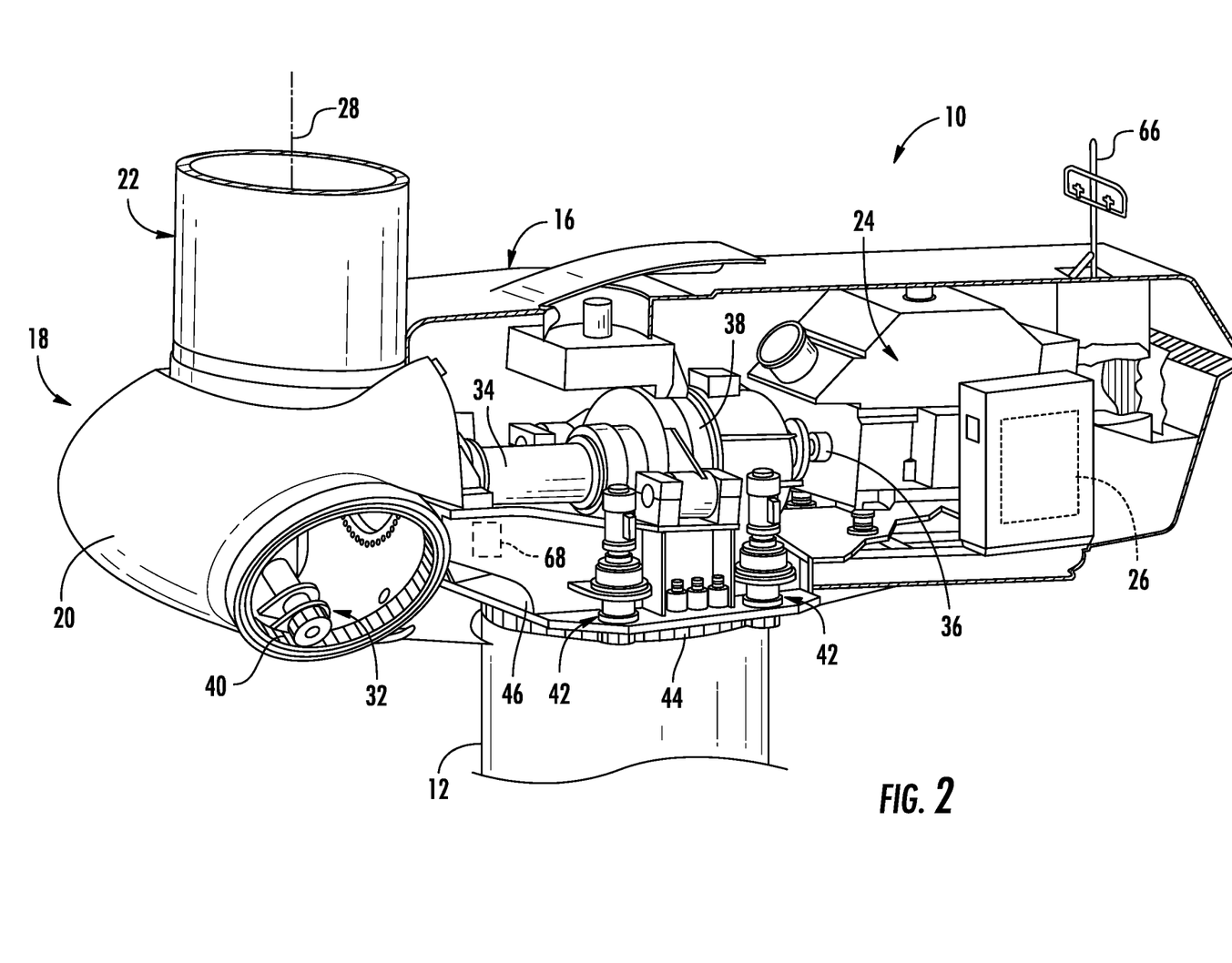
FIG. 2 illustrates a simplified, internal view of one embodiment of a nacelle according to the present disclosure.

Referring now to FIG. 2, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 3:
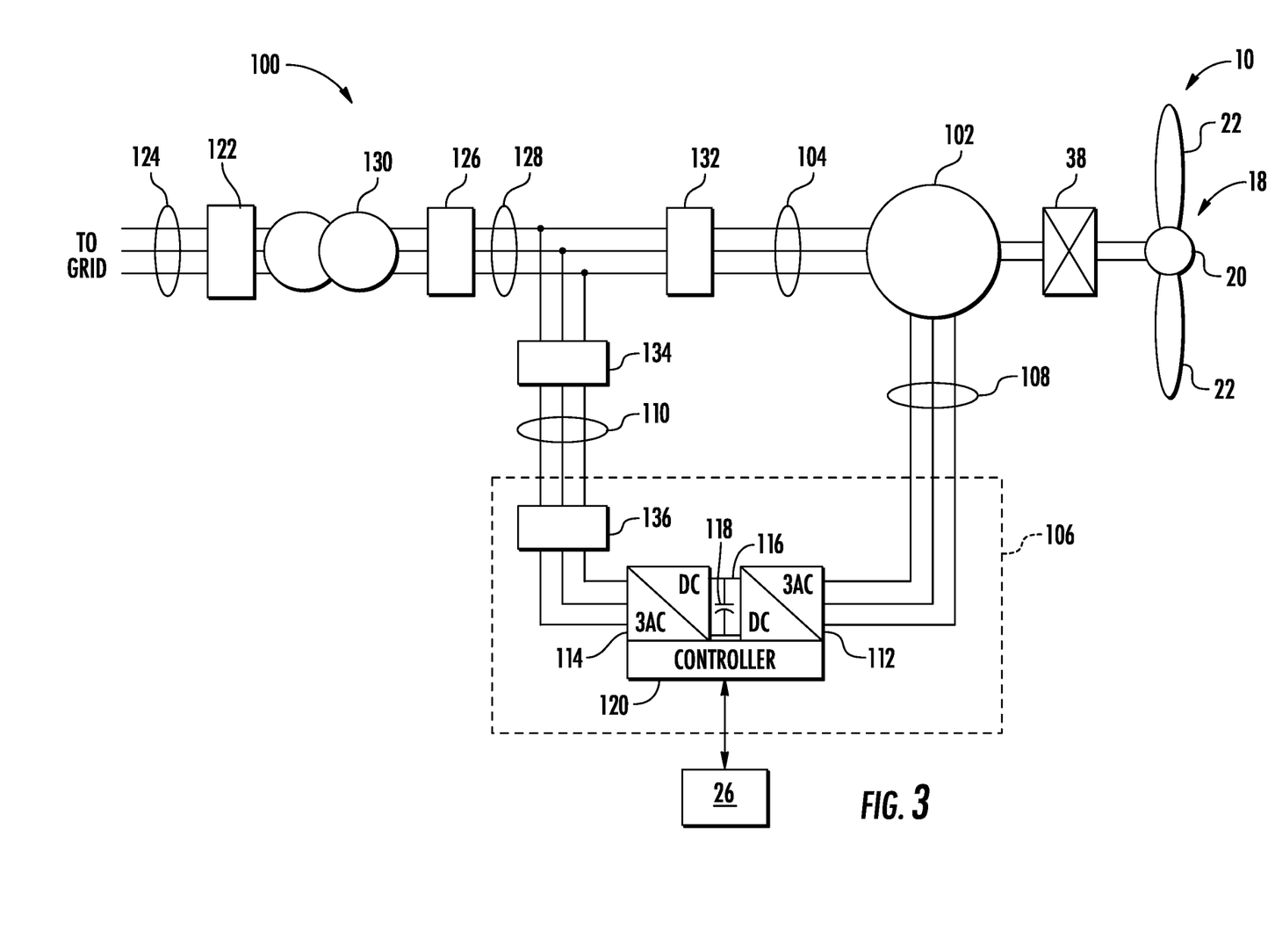
FIG. 3 illustrates a schematic view of one embodiment of a wind turbine electrical power system suitable for use with the wind turbine shown in FIG. 1.

Referring now to FIG. 3, a schematic diagram of one embodiment of a wind turbine power system 100 is illustrated in accordance with aspects of the present disclosure. Although the present disclosure will generally be described herein with reference to the wind turbine 10 shown in FIG. 1, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 3 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor-side converter (RSC) 112 and a line-side converter (LSC) 114. The DFIG 102 is coupled via the rotor bus 108 to the rotor-side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor-side converter 112 and/or the line-side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus 108, sinusoidal multi-phase (e.g., three-phase) alternating current (AC) power is provided to the power converter 106. The rotor-side converter 112 converts the AC power provided from the rotor bus 108 into direct current (DC) power and provides the DC power to the DC link 116. As is generally understood, switching elements (e.g., IGBTs) used in the bridge circuits of the rotor-side converter 112 may be modulated to convert the AC power provided from the rotor bus 108 into DC power suitable for the DC link 116.

In addition, the line-side converter 114 converts the DC power on the DC link 116 into AC output power suitable for the electrical grid 124. In particular, switching elements (e.g., IGBTs) used in bridge circuits of the line-side converter 114 can be modulated to convert the DC power on the DC link 116 into AC power on the line side bus 110. The AC power from the power converter 106 can be constrained with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 4:
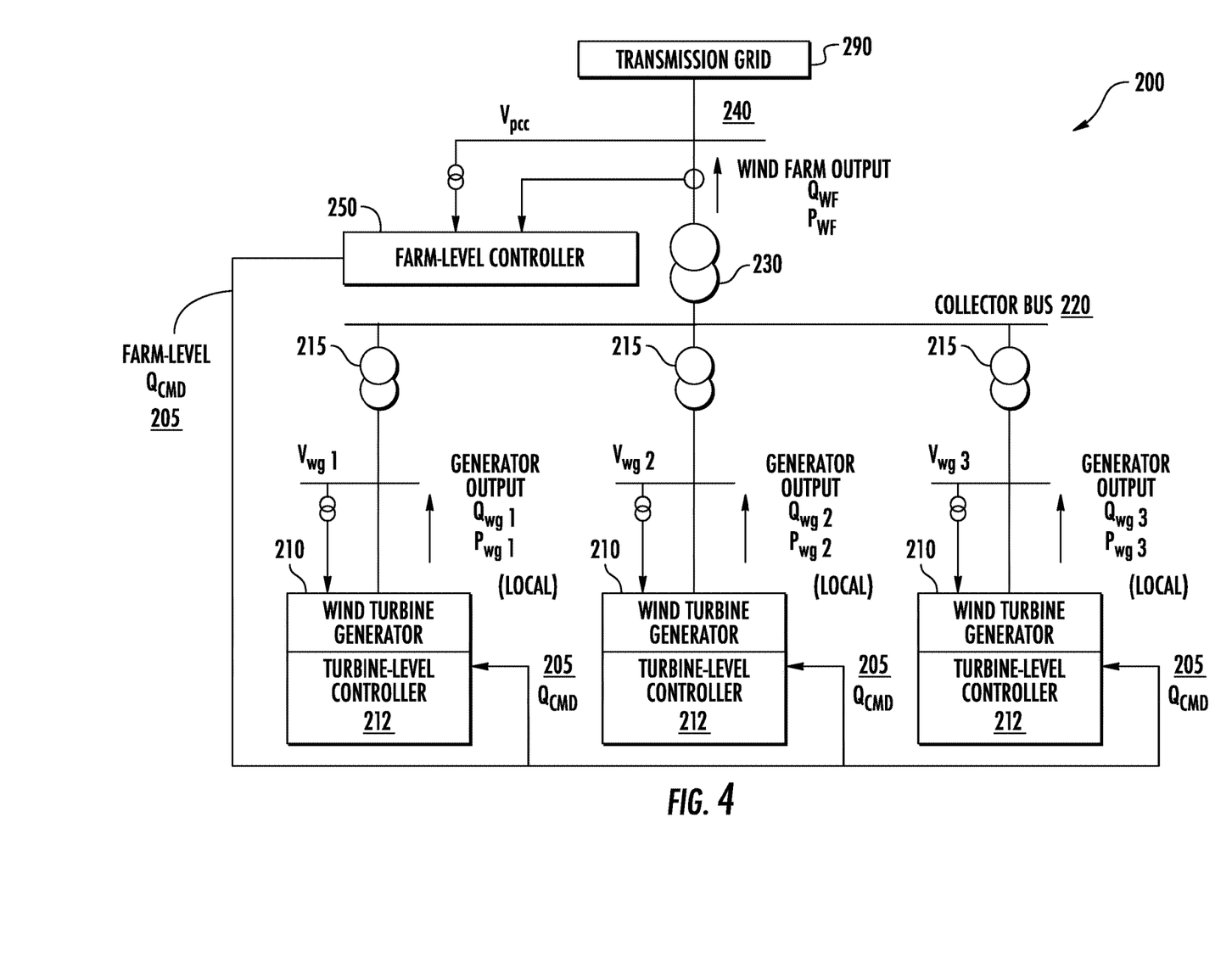
FIG. 4 illustrates a block diagram of a wind farm having multiple wind turbine generators coupled with a transmission grid according to the present disclosure.

Referring now to the drawings, FIG. 4 illustrates a block diagram of a wind farm 200 having a plurality of wind turbine generators 210 coupled with a transmission grid 190. FIG. 4 illustrates three wind generators 210; however, any number of wind generators can be included in a wind farm 200. Further, as shown, each of the wind turbine generators 210 includes a local controller 212 that is responsive to the conditions of the wind turbine generator 210 being controlled. In one embodiment, the controller for each wind turbine generator senses only the terminal voltage and current (via potential and current transformers). The sensed voltage and current are used by the local controller to provide an appropriate response to cause the wind turbine generator 210 to provide the desired reactive power.

Each wind turbine generator 210 is coupled to collector bus 220 through generator connection transformers 215 to provide real and reactive power (labeled $P_{wg}$ and $Q_{wg}$, respectively) to the collector bus 220. Generator connection transformers and collector buses are known in the art.

The wind farm 200 provides real and reactive power output (labeled $P_{wf}$ and $Q_{wf}$, respectively) via wind farm main transformer 230. The farm-level controller 250, which is communicatively coupled to the turbine-level controllers 212, senses the wind farm output, as well as the voltage at the point of common coupling (PCC) 240, to provide a Q command signal 205 ($Q_{CMD}$) that indicates desired reactive power at the generator terminals to ensure a reasonable distribution of reactive power among the wind turbines. In alternate embodiments, the Q command signal ($Q_{CMD}$) 205 may be generated as the local or operator level (indicated by the "LOCAL" lines in FIG. 4), for example in the event that the wind turbine generator(s) is in manual mode or otherwise not in communication with the wind farm-level controller 250.

Figure 5:
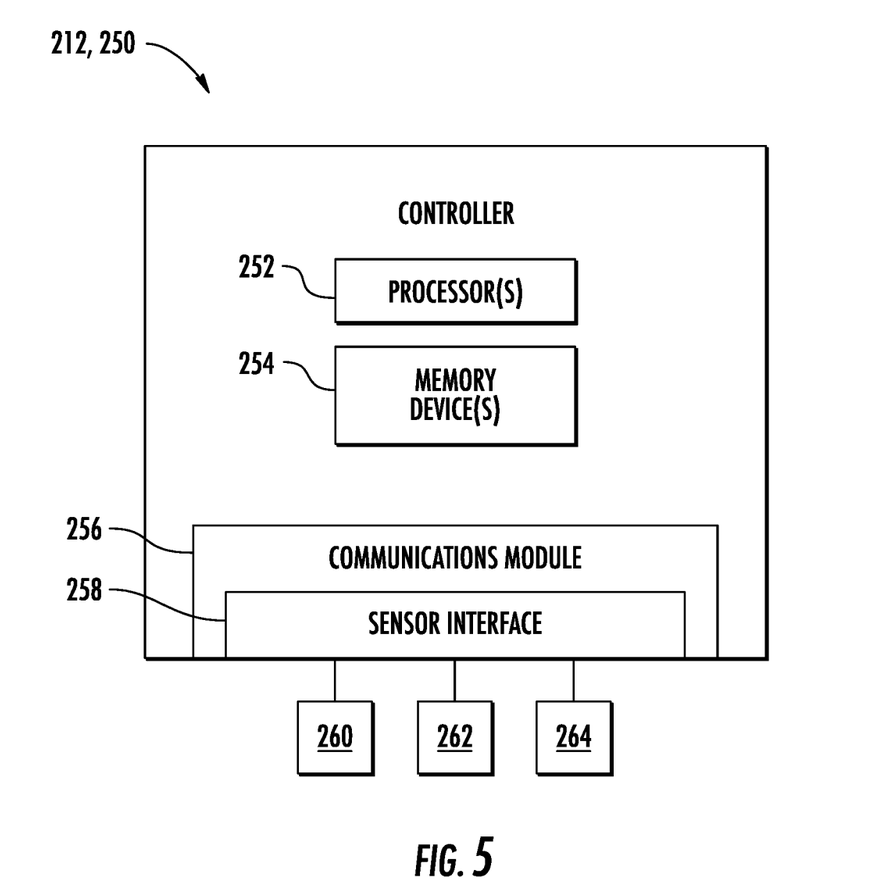
FIG. 5 illustrates a block diagram of suitable components that may be included in one embodiment of a farm-level controller according to the present disclosure.

Referring now to FIG. 5, a block diagram of one embodiment of suitable components that may be included within the turbine-level controllers 212 and/or the farm-level controller 250 in accordance with aspects of the present disclosure is illustrated. As shown, the controller 212, 250 may include one or more processor(s) 252 and associated memory device(s) 254 configured to perform a variety of computer-implemented functions (e.g., performing the methods, steps, calculations and the like and storing relevant data as disclosed herein). Additionally, the controller 212, 250 may also include a communications module 256 to facilitate communications between the controller 212, 250 and the various components of the wind farm 200. Further, the communications module 256 may include a sensor interface 258 (e.g., one or more analog-to-digital converters) to permit signals transmitted from one or more sensors 260, 262, 264 to be converted into signals that can be understood and processed by the processors 252. It should be appreciated that the sensors 260, 262, 264 may be communicatively coupled to the communications module 256 using any suitable means. For example, as shown, the sensors 260, 262, 264 are coupled to the sensor interface 258 via a wired connection. However, in other embodiments, the sensors 260, 262, 264 may be coupled to the sensor interface 258 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 254 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 254 may generally be configured to store suitable computer-readable instructions that, when implemented by the processor(s) 252, configure the controller 212, 250 to perform various functions as described herein.

The sensors 260, 262, 264 may include any suitable sensors configured to provide feedback measurements to the farm-level controller 250. In various embodiments, for example, the sensors 260, 262, 264 may be any one of or combination of the following: voltage sensors, current sensors, and/or any other suitable sensors.

Figure 6:
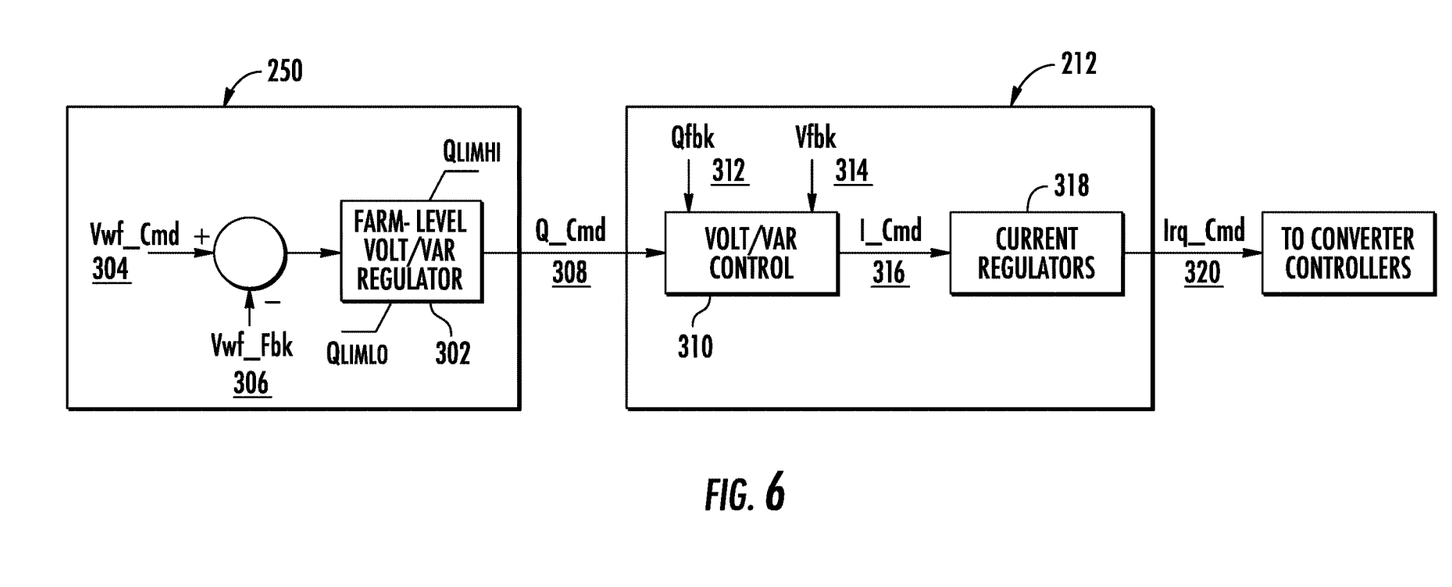
FIG. 6 illustrates a functional diagram of one embodiment of farm-level and turbine-level regulators according to the present disclosure.
Figure 7:
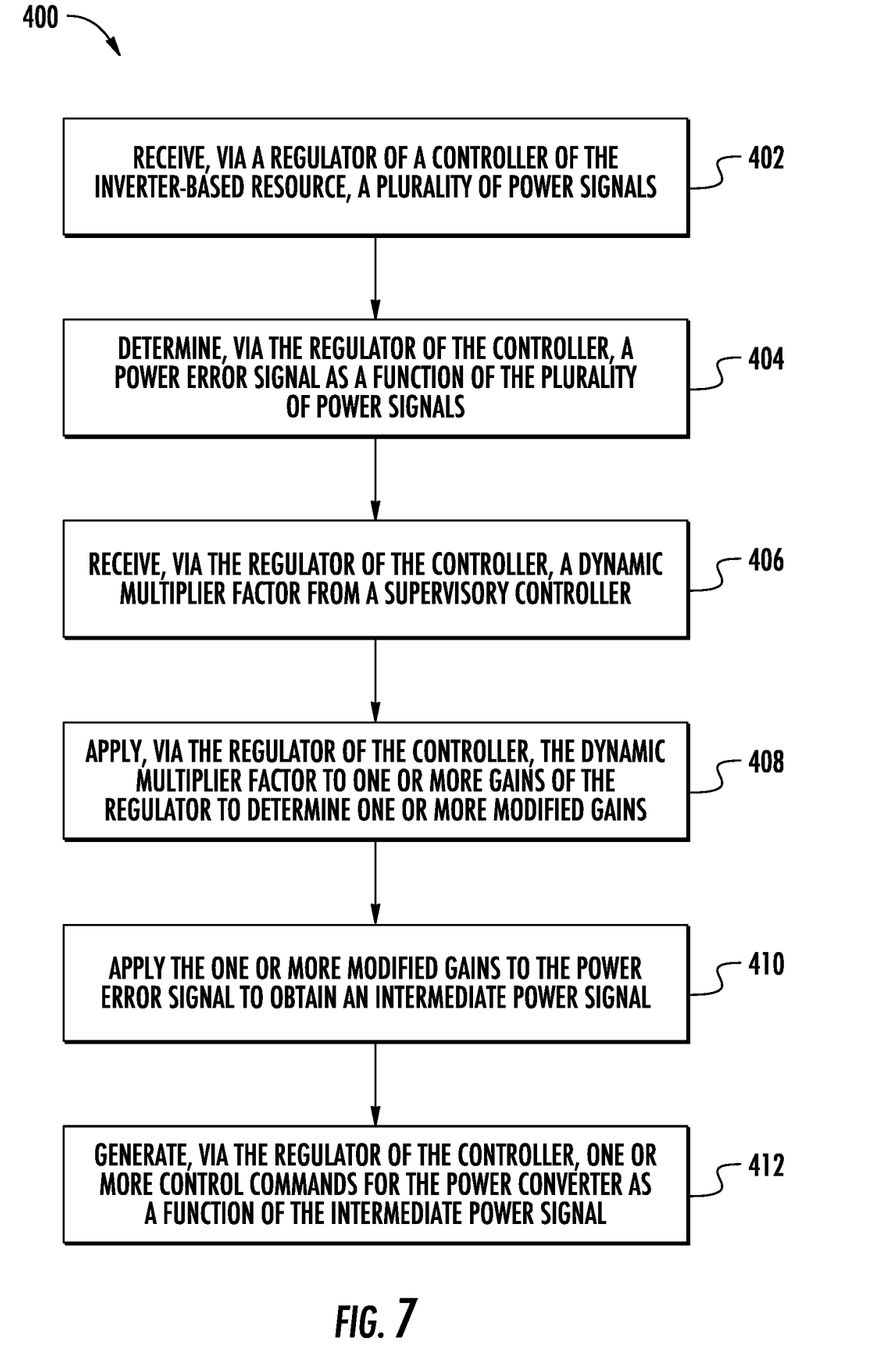
FIG. 7 illustrates a flow diagram of one embodiment of a method for controlling an inverter-based resource connected to an electrical grid according to the present disclosure.
Figure 8:
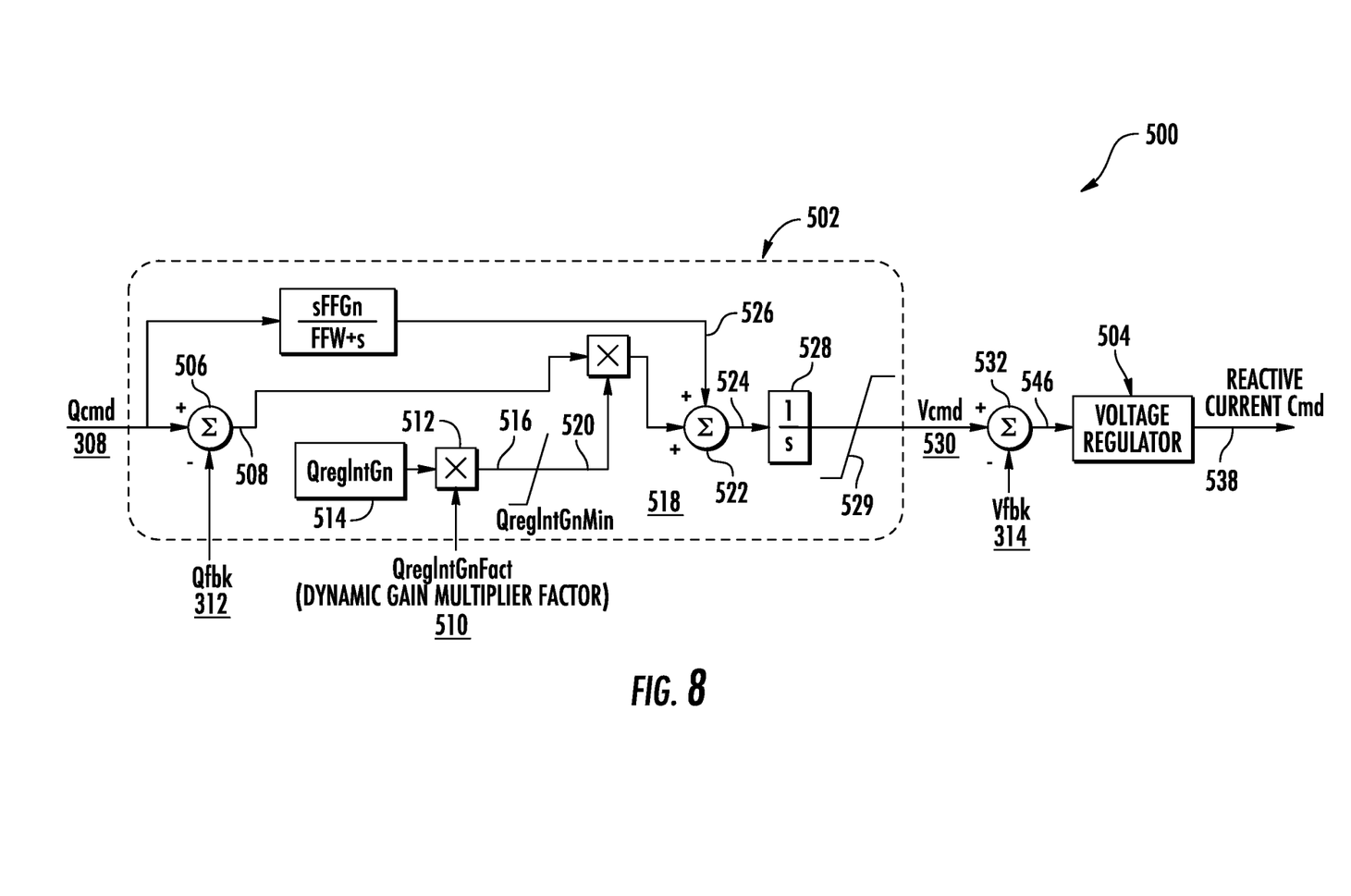
FIG. 8 illustrates a functional diagram of one embodiment of a system for controlling an inverter-based resource connected to an electrical grid according to the present disclosure.

Referring now to FIGS. 6-8, embodiments of various systems and methods for controlling a power plant, such as a wind farm, according to the present disclosure are illustrated. In particular, FIG. 6 illustrates a functional diagram of one embodiment of a system 300 having a supervisory controller (e.g., such as farm-level controller 250) and the turbine-level controllers 212 according to the present disclosure. FIG. 7 illustrates a flow diagram of one embodiment of a method 400 for controlling an inverter-based resource connected to an electrical grid, such as wind turbine, according to the present disclosure. FIG. 8 illustrates a functional diagram of an embodiment of the turbine-level controllers 212 according to the present disclosure.

Referring particularly to FIG. 6, a practical implementation of the system 300 for controlling the wind farm 200 is illustrated. In particular, as shown, the farm-level controller 250 may include a volt-var regulator 302 with upper and lower limits (e.g., $Q_{LIMHI}$ and $Q_{LIMLO}$). More specifically, as shown, the farm-level controller 250 is configured to receive one or more voltage commands of the wind farm 200 (e.g., Vwf_Cmd 304) and one or more voltage feedbacks of the wind farm 200 (e.g., Vwf_Fbk 306) that may be used by the farm-level volt-var regulator 302 for determining a reactive power command signal (e.g., Q_Cmd 308) for the turbine-level controllers 212. Moreover, as shown, each of the turbine-level controllers 212 receives the reactive power command signal 308 (i.e., via their respective turbine-level volt-var regulators 310). Thus, as shown, the turbine-level volt-var regulators 310 also receive various other parameters, such as reactive power feedbacks (e.g., QFbk 312) and voltage feedbacks (e.g., VFbk 314) of the individual wind turbines, to determine current commands (e.g., I_Cmd 316) for their respective current regulators 318. Thus, the current regulators 318 of the individual wind turbines are configured for generating a rotor current command (e.g., Irq_Cmd) 320 for the converter controller 120 of the power converter 106.

Referring now to FIG. 7, the method 400 described herein generally applies to controlling an inverter-based resource, such as wind turbine 10, which may be part of a power plant having a plurality of inverter-based resources, such as wind farm 200 described herein with respect to FIGS. 4 and 6. Thus, in such embodiments, the power plant (e.g., the wind farm 200) may be controlled by a supervisory controller (e.g., farm-level controller 250). However, it should be appreciated that the disclosed method 400 may be implemented using any other inverter-based resource that is configured to supply reactive power such as a solar power system, a hydropower system, an energy storage power system, or combinations thereof. Further, FIG. 7 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (402), the method 400 includes receiving, via a regulator of a controller of the inverter-based resource, a plurality of power signals, e.g., issued by a supervisory controller. In an embodiment, for example, the plurality of power signals may include a power command signal and a power feedback signal. In such embodiments, the power command signal may be a reactive power command signal or an active power command signal, whereas the power feedback signal may be a reactive power feedback signal or an active power feedback signal.

As shown at (404), the method 400 includes determining, via the regulator of the controller, a power error signal as a function of the plurality of power signals. As shown at (406), the method 400 includes receiving, via the regulator of the controller, a dynamic multiplier factor from the supervisory controller. In an embodiment, for example, the method 400 may include dynamically determining, via the supervisory controller, the dynamic multiplier factor as a function of a number of the plurality of inverter-based resources that are online. For example, in particular embodiments, the supervisory controller is configured to determine the number of the plurality of inverter-based resources that are online and then divide the number of the plurality of inverter-based resources that are online by a total number of the plurality of inverter-based resources in the power plant.

Reactive power regulators and active power regulators bandwidth/gain are inversely proportional to the effective grid impedance seen by a collection of inverter-based resource within a power plant. The effective grid impedance changes based on the number of inverter-based resource online within a plant (e.g., fewer turbines online means lower effective impedance, and vice versa). Thus, by adaptively adjusting the gains of active/reactive power regulator in proportion to the number of wind turbines online, the effective gain of the loop can be made independent of the number of wind turbines online, thereby allowing control performance of the power plant to be consistent with changing number of units online within the power plant.

Still referring to FIG. 7, as shown at (408), the method 400 includes applying, via the regulator of the controller, the dynamic multiplier factor to one or more gains of the regulator to determine one or more modified gains. In addition, in an embodiment, the method 400 may include applying a limit to the modified gain(s) to limit how much the gain(s) can be reduced after applying the dynamic multiplier factor. Thus, as shown at (410), the method 400 includes applying the modified gain(s) to the power error signal to obtain an intermediate power signal. As shown at (412), the method 400 includes generating, via the regulator of the controller, one or more control commands for the power converter as a function of the intermediate power signal.

The method 400 of FIG. 7 can be better understood with reference to the system 500 illustrated in FIG. 8. As shown, the system 500 includes a power regulator 502 and a voltage regulator 504, which together, are generally illustrated in FIG. 6 as the volt/var regulator 310. Thus, as shown, the power regulator 502 receives the reactive power command signal 308 (e.g., Q_Cmd) from the farm-level controller 250 and the reactive power feedback signal 312 (e.g., Q_Fbk). Moreover, as shown at 506, the power regulator 502 determines a power error signal 508.

In addition, as shown, the power regulator 502 receives a dynamic multiplier factor 510 from the farm-level controller 250. In an embodiment, for example, the farm-level controller 250 may dynamically determine the dynamic multiplier factor 510 as a function of a number of wind turbines of the wind farm 200 that are online, which is proportional to grid impedance seen by the collection of wind turbines online. The grid impedance is a metric for quantifying grid strength (or short-circuit ratio). Therefore, calculating the proportion of wind turbines online within the plant is an indirect method for estimating the effective grid strength seen by the wind turbines that are online within the plant. For example, in particular embodiments, the farm-level controller 250 is configured to determine the number of wind turbines of the wind farm 200 that are online and then divide the number of the wind turbines of the wind farm 200 that are online by a total number of wind turbines in the wind farm 200. Thus, by making the dynamic multiplier-factor proportional to a measure of grid strength or short circuit ratio (SCR), the regulator response time becomes tailored to the power converter's ability for creating stable reactive power flow at the point of grid connection, with the benefit of a stabilizing effect on voltage.

Still referring to FIG. 8, as shown at (512), the power regulator 502 is then configured to apply the dynamic multiplier factor 510 to one or more gains 514 of the power regulator 502 to determine one or more modified gains 516. In addition, as shown, the power regulator 502 may also apply a limiter 518 to the modified gain(s) 516 to limit how much the gain(s) can be reduced after applying the dynamic multiplier factor 510. Thus, as shown, the power regulator 502 is configured to apply the modified gain(s) 516 to the power error signal 508 to obtain an intermediate power signal 520.

Accordingly, as shown at (522), the power regulator 502 is configured to generate one or more control commands 538 for the power converter 106 as a function of the intermediate power signal 520. More specifically, as shown, the power regulator 502 may determine a feedforward signal 526 as a function of one of the plurality of power signals (e.g., the reactive power command signal 308 (e.g., Q_Cmd) and generate the control command(s) 538 for the power converter 106 as a function of the intermediate power signal 520 and the feedforward signal 526. More specifically, in an embodiment, as shown, the power regulator 502 is configured to generate the control command(s) 538 for the power converter 106 by summing the intermediate power signal 520 and the feedforward signal 526 together to obtain a sum 524. Further, as shown, the sum 524 can be integrated via integrator 528 to determine a voltage command 530 (e.g., Vcmd). In certain embodiments, as shown, the voltage command may also be optionally limited via a limiter 529. Thus, as shown at 532, the system 500 is configured to determine a voltage error signal 536 as a function of the voltage command 530 and one or more voltage feedback signals 314 (e.g., Vfbk; see also FIG. 6). Accordingly, as shown, the voltage regulator 504 is configured to regulate the voltage error signal 536 to generate the control command(s) 538. More specifically, as shown, the control command(s) 538 may be a reactive current command for the power converter 106.

Figure 9:
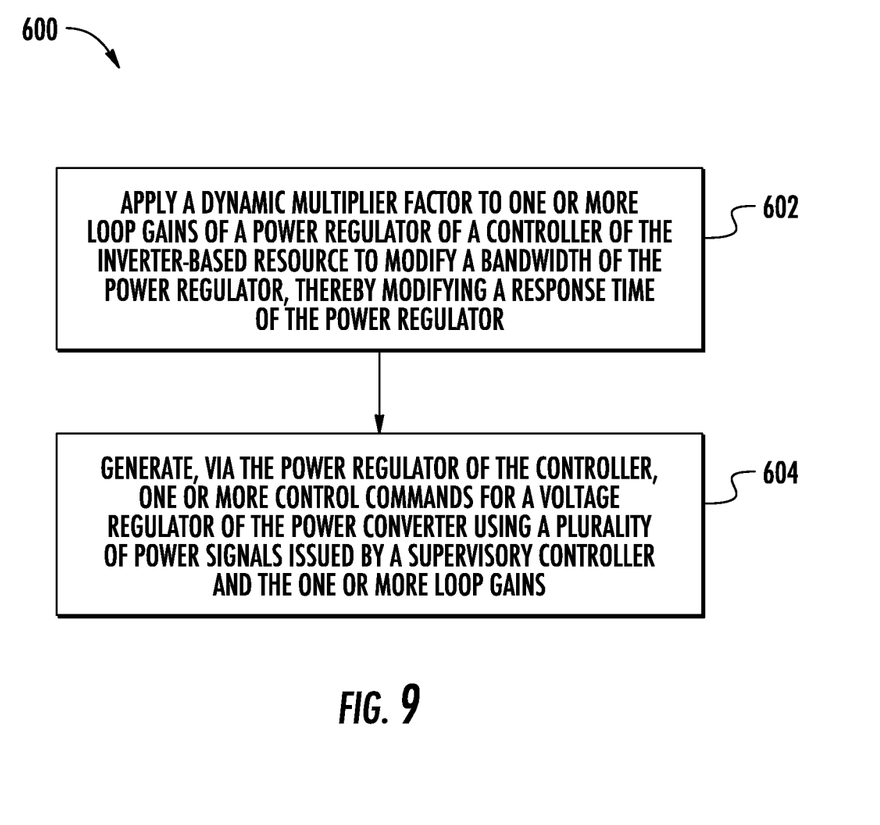
FIG. 9 illustrates a flow diagram of another embodiment of a method for controlling an inverter-based resource connected to an electrical grid according to the present disclosure.

Referring now to FIG. 9, a flow diagram of another embodiment of a method 600 for controlling an inverter-based resource connected to an electrical grid is illustrated. The method 600 generally applies to controlling an inverter-based resource, such as wind turbine 10, which may be part of a power plant having a plurality of inverter-based resources, such as wind farm 200 described herein with respect to FIGS. 4 and 6. However, it should be appreciated that the disclosed method 600 may be implemented using any other inverter-based resource that is configured to supply reactive power for application to a load, such as a power grid, such as a solar power system, a hydropower system, an energy storage power system, or combinations thereof. Further, FIG. 9 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (502), the method 600 includes applying a dynamic multiplier factor to one or more gains of a power regulator of a controller of the inverter-based resource to modify a bandwidth of the power regulator, thereby modifying a response time of the power regulator. As shown at (504), the method 600 includes generating, via the power regulator of the controller, one or more control commands for a voltage regulator of the power converter using a plurality of power signals issued by a supervisory controller and the one or more gains.

Further aspects of the invention are provided by the subject matter of the following clauses:

Clause 1. A method for controlling an inverter-based resource connected to an electrical grid, the inverter-based resource having a power converter, the method comprising:
receiving, via a regulator of a controller of the inverter-based resource, a plurality of power signals;
determining, via the regulator of the controller, a power error signal as a function of the plurality of power signals;
receiving, via the regulator of the controller, a dynamic multiplier factor from a supervisory controller;
applying, via the regulator of the controller, the dynamic multiplier factor to one or more gains of the regulator to determine one or more modified gains;
applying the one or more modified gains to the power error signal to obtain an intermediate power signal; and
generating, via the regulator of the controller, one or more control commands for the power converter as a function of the intermediate power signal.

Clause 2. The method of clause 1, wherein the plurality of power signals comprises a power command signal and a power feedback signal.

Clause 3. The method of clause 2, wherein the power command signal is at least one of a reactive power command signal or an active power command signal and the power feedback signal is at least one of a reactive power feedback signal or an active power feedback signal.

Clause 4. The method of any of the preceding clauses, wherein the inverter-based resource is part of a power plant having a plurality of inverter-based resources, the power plant being controlled by the supervisory controller.

Clause 5. The method of clause 4, wherein the inverter-based resource comprises a wind turbine and the power plant comprises a wind farm.

Clause 6. The method of clauses 4-5, further comprising dynamically determining, via the supervisory controller, the dynamic multiplier factor as a function of a number of the plurality of inverter-based resources that are online.

Clause 7. The method of clause 6, wherein dynamically determining, via the supervisory controller, the dynamic multiplier factor as a function of the number of the plurality of inverter-based resources that are online further comprises:
 determining the number of the plurality of inverter-based resources that are online; and
 dividing the number of the plurality of inverter-based resources that are online by a total number of the plurality of inverter-based resources in the power plant.

Clause 8. The method of any of the preceding clauses, further comprising applying a limit to the one or more modified gains to limit how much the one or more gains can be reduced after applying the dynamic multiplier factor.

Clause 9. The method of any of the preceding clauses, further comprising:
 determining, via the regulator of the controller, a feedforward signal as a function of one of the plurality of power signals; and
 generating, via the regulator of the controller, the one or more control commands for the power converter as a function of the intermediate power signal and the feedforward signal.

Clause 10. The method of clause 9, wherein generating, via the regulator of the controller, the one or more control commands for the power converter as a function of the intermediate power signal and the feedforward signal further comprises:
 summing the intermediate power signal and the feedforward signal together to obtain a sum;
 integrating the sum to determine a voltage command;
 determining a voltage error signal as a function of the voltage command and one or more voltage feedback signals; and
 regulating, via a voltage regulator of the controller, the voltage error signal to generate the one or more control commands, the one or more control commands comprising, at least, a reactive current command for the power converter.

Clause 11. A method for controlling an inverter-based resource connected to an electrical grid, the inverter-based resource having a power converter, the method comprising:
 applying a dynamic multiplier factor to one or more gains of a power regulator of a controller of the inverter-based resource to modify a bandwidth of the power regulator, thereby modifying a response time of the power regulator; and
 generating, via the power regulator of the controller, one or more control commands for a voltage regulator of the power converter using a plurality of power signals issued by a supervisory controller and the one or more gains.

Clause 12. A system for controlling an inverter-based resource connected to an electrical grid, the inverter-based resource having a power converter, the system comprising:
 a supervisory controller;
 a local controller communicatively coupled to the supervisory controller, the local controller comprising a power regulator and a voltage regulator, the power regulator configured to perform a plurality of operations, the plurality of operations comprising:
 receiving a plurality of power signals;
 determining a power error signal as a function of the plurality of power signals;
 receiving a dynamic multiplier factor from the supervisory controller;
 applying the dynamic multiplier factor to one or more gains of the regulator to determine one or more modified gains;
 applying the one or more modified gains to the power error signal to obtain an intermediate power signal; and
 generating one or more control commands for the power converter as a function of the intermediate power signal.

Clause 13. The system of clause 12, wherein the plurality of power signals comprises a power command signal and a power feedback signal.

Clause 14. The system of clause 13, wherein the power command signal is at least one of a reactive power command signal or an active power command signal and the power feedback signal is at least one of a reactive power feedback signal or an active power feedback signal.

Clause 15. The system of clauses 12-14, wherein the inverter-based resource is part of a power plant having a plurality of inverter-based resources, the power plant being controlled by the supervisory controller.

Clause 16. The system of clause 15, wherein the inverter-based resource comprises a wind turbine and the power plant comprises a wind farm.

Clause 17. The system of clauses 15-16, wherein the supervisory controller dynamically determines the dynamic multiplier factor as a function of a number of the plurality of inverter-based resources that are online.

Clause 18. The system of clause 17, wherein the supervisory controller dynamically determines the dynamic multiplier factor as a function of a number of the plurality of inverter-based resources that are online by determining the number of the plurality of inverter-based resources that are online and then dividing the number of the plurality of inverter-based resources that are online by a total number of the plurality of inverter-based resources in the power plant.

Clause 19. The system of clauses 12-18, further comprising applying a limit to the one or more modified gains to limit how much the one or more gains can be reduced after applying the dynamic multiplier factor.

Clause 20. The system of clauses 12-19, further comprising:
 determining, via the regulator of the controller, a feedforward signal as a function of one of the plurality of power signals; and
 generating, via the regulator of the controller, the one or more control commands for the power converter as a function of the intermediate power signal and the feedforward signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an inverter-based resource connected to an electrical grid, the inverter-based resource having a power converter, the inverter-based resource being part of a power plant having a plurality of inverter-based resources, the power plant being controlled by the supervisory controller, the method comprising:
receiving, via a regulator of a local controller of the inverter-based resource, a plurality of power signals;
determining, via the regulator of the controller, a power error signal as a function of the plurality of power signals;
dynamically determining a dynamic multiplier factor as a function of a number of the plurality of inverter-based resources that are online, wherein the number of the plurality of inverter-based resources that are online is proportional to an effective grid strength seen by the number of the plurality of inverter-based resources that are online;
receiving, via the regulator of the controller, the dynamic multiplier factor from a supervisory controller;
applying, via the regulator of the controller, the dynamic multiplier factor to one or more gains of the regulator to determine one or more modified gains;
applying the one or more modified gains to the power error signal to obtain an intermediate power signal; and
generating, via the regulator of the controller, one or more control commands for the power converter as a function of the intermediate power signal.

2. The method of claim 1, wherein the plurality of power signals comprises a power command signal and a power feedback signal.

3. The method of claim 2, wherein the power command signal is at least one of a reactive power command signal or an active power command signal and the power feedback signal is at least one of a reactive power feedback signal or an active power feedback signal.

4. The method of claim 1, wherein the inverter-based resource comprises a wind turbine and the power plant comprises a wind farm.

5. The method of claim 1, wherein dynamically determining, via the supervisory controller, the dynamic multiplier factor as a function of the number of the plurality of inverter-based resources that are online further comprises:
determining the number of the plurality of inverter-based resources that are online; and
dividing the number of the plurality of inverter-based resources that are online by a total number of the plurality of inverter-based resources in the power plant to determine the dynamic multiplier factor.

6. The method of claim 1, further comprising applying a limit to the one or more modified gains to limit how much the one or more gains can be reduced after applying the dynamic multiplier factor.

7. The method of claim 1, further comprising:
determining, via the regulator of the controller, a feedforward signal as a function of one of the plurality of power signals; and
generating, via the regulator of the controller, the one or more control commands for the power converter as a function of the intermediate power signal and the feedforward signal.

8. The method of claim 7, wherein generating, via the regulator of the controller, the one or more control commands for the power converter as a function of the intermediate power signal and the feedforward signal further comprises:
summing the intermediate power signal and the feedforward signal together to obtain a sum;
integrating the sum to determine a voltage command;
determining a voltage error signal as a function of the voltage command and one or more voltage feedback signals; and
regulating, via a voltage regulator of the controller, the voltage error signal to generate the one or more control commands, the one or more control commands comprising, at least, a reactive current command for the power converter.

9. A method for controlling an inverter-based resource connected to an electrical grid, the inverter-based resource having a power converter, the method comprising:
dynamically determining a dynamic multiplier factor as a function of a number of the plurality of inverter-based resources that are online, wherein the number of the plurality of inverter-based resources that are online is proportional to an effective grid strength seen by the number of the plurality of inverter-based resources that are online;
applying the dynamic multiplier factor to one or more gains of a power regulator of a controller of the inverter-based resource to modify a bandwidth of the power regulator, thereby modifying a response time of the power regulator; and
generating, via the power regulator of the controller, one or more control commands for a voltage regulator of the power converter using a plurality of power signals issued by a supervisory controller and the one or more gains.

10. A system for controlling an inverter-based resource connected to an electrical grid, the inverter-based resource having a power converter, the inverter-based resource being part of a power plant having a plurality of inverter-based resources, the power plant being controlled by the supervisory controller, the system comprising:
a supervisory controller;
a local controller communicatively coupled to the supervisory controller, the local controller comprising a power regulator and a voltage regulator, the power regulator configured to perform a plurality of operations, the plurality of operations comprising:
receiving a plurality of power signals;
determining a power error signal as a function of the plurality of power signals;
dynamically determining a dynamic multiplier factor as a function of a number of the plurality of inverter-based resources that are online, wherein the number of the plurality of inverter-based resources that are online is proportional to an effective grid strength seen by the number of the plurality of inverter-based resources that are online;
receiving the dynamic multiplier factor from the supervisory controller;
applying the dynamic multiplier factor to one or more gains of the regulator to determine one or more modified gains;
applying the one or more modified gains to the power error signal to obtain an intermediate power signal; and generating one or more control commands for the power converter as a function of the intermediate power signal.

11. The system of claim 10, wherein the plurality of power signals comprises a power command signal and a power feedback signal.

12. The system of claim 11, wherein the power command signal is at least one of a reactive power command signal or an active power command signal and the power feedback signal is at least one of a reactive power feedback signal or an active power feedback signal.

13. The system of claim 10, wherein the inverter-based resource comprises a wind turbine and the power plant comprises a wind farm.

14. The system of claim 10, wherein the supervisory controller dynamically determines the dynamic multiplier factor as a function of the number of the plurality of inverter-based resources that are online by determining the number of the plurality of inverter-based resources that are online and then dividing the number of the plurality of inverter-based resources that are online by a total number of the plurality of inverter-based resources in the power plant.

15. The system of claim 10, further comprising applying a limit to the one or more modified gains to limit how much the one or more gains can be reduced after applying the dynamic multiplier factor.

16. The system of claim 10, further comprising:
  determining, via the regulator of the controller, a feedforward signal as a function of one of the plurality of power signals; and
  generating, via the regulator of the controller, the one or more control commands for the power converter as a function of the intermediate power signal and the feedforward signal.

\* \* \* \* \*